United States Patent [19]

Andre et al.

[11] 4,255,083

[45] Mar. 10, 1981

[54] METHOD AND DEVICE FOR REDUCING THE NOISE OF TURBO-MACHINES

[75] Inventors: Pierre A. Andre, Paris; Jean-Claude P. H. P. Thevenin, Saint-Maur-Des-Fosses; Jean-Pierre Y. B. Girault, Dammarie Les Lys; Gerhard Richter, Boissise Le Roi, all of France

[73] Assignee: Societe Nationale D'Etude Et De Construction De Moteurs D'Aviation, Paris, France

[21] Appl. No.: 849,472

[22] Filed: Dec. 27, 1977

[30] Foreign Application Priority Data

Nov. 7, 1976 [FR] France .................................. 76 30465

[51] Int. Cl.³ ............................ F01D 5/10; F01D 5/26
[52] U.S. Cl. ..................................... 415/119; 181/206; 60/226 R
[58] Field of Search ......................... 415/115, 116, 119; 181/206; 415/119

[56] References Cited

U.S. PATENT DOCUMENTS

| | | | |
|---|---|---|---|
| 3,693,749 | 9/1972 | Motsinger et al. ................... | 415/119 |
| 3,936,606 | 2/1976 | Wanke ................................. | 181/206 |
| 3,951,566 | 4/1976 | Mattei et al. ......................... | 415/119 |
| 4,044,203 | 8/1977 | Swinbanks ........................... | 181/206 |

Primary Examiner—Louis J. Casaregola
Attorney, Agent, or Firm—Watson, Cole, Grindle & Watson

[57] ABSTRACT

A method and device for reducing the noise produced in a turbo-machine by the interaction of the blades of a ring of rotor blades and the vanes of a ring of stator vanes by the creation of a counter-noise of opposed phase. This is achieved by the injection of a fluid into the flow passage of the machine in which the blades and vanes are located. The injection is carried out through orifices located on stationary parts of the machine and equal in number to the vanes of rings of stator vanes, the flow through the orifices being modulated at the frequency of the noise to be reduced and with a phase difference which increases in an incremental manner from one orifice to the next. The phase of the modulated flows injected through the orifices is simultaneously regulated so that the acoustic waves created by the flows are substantially in opposition, with respect to phase, to those of the noise to be reduced.

5 Claims, 12 Drawing Figures

METHOD AND DEVICE FOR REDUCING THE NOISE OF TURBO-MACHINES

BACKGROUND OF THE INVENTION

This invention relates, generally, to the reduction of noise produced in a turbo-machine by the blades of a rotary ring of blades, either acting alone or in cooperation with the blades of a ring of stator vanes, and which blades generate a noise at their frequency of passage or, possibly, at a multiple of this frequency.

To reduce this noise, it has already been suggested to generate a kind of "counter-noise" at the same frequency of that to be reduced, but substantially opposed in phase to this latter.

One of the suggested solutions consisted in employing a secondary source of noise placed immediately adjacent the principal noise generator. By emitting a noise with an adequate frequency make-up and carefully selecting the amplitude and phase conditions, in certain sectors a reduction and even an obliteration of noise could be obtained by interference.

It has also been suggested to reproduce the noise of the rotor by injecting jets of pressurized fluid into the flow passage of the machine through orifices in one or a multiplicity of adjustable rings rotating with the rotor. The feeding of fluid should be done by way of the fan shaft.

None of these solutions has, however, provided a satisfactory result, either because their carrying out proved to be too complicated to be used in practice, or because the results obtained were too limited to compensate for the disadvantages arising from the installation of such a system.

Thus, the object of the invention is to obtain a better result together with a simplification of the method whereby the construction costs are more reasonable.

SUMMARY OF THE INVENTION

The reduction of the noise produced by the blades of a turbo-machine is obtained by the creation of a counter-noise of opposing phase by means of the injection of fluid into the flow passage of the turbo-machine in which the blades are located, this fluid being injected through at least one orifice located on a stationary part of the machine, the fluid flow being modulated at the frequency of the noise which is to be reduced and the phase of the modulated flow being regulated in such a manner that the acoustic waves created by the flow are substantially of opposed phase to those of the noise to be reduced.

The fluid used for the injection can be a gas, for example air, picked-up on a part of the machine where this gas has sufficient pressure.

When it is a matter of reducing the noise of only the rotor, the injection may be restricted to a single aperture.

According to the invention, when noise is produced in a turbo-machine by the interaction of the blades of a ring of rotor blades and the vanes of a ring of stator vanes, the injection is carried out in the flow passage of the machine in which the blades and vanes are located, through orifices located on stationary parts of the machine and equal in number to the vanes of the stator ring. The flow through the orifices is modulated at the frequency of the noise to be reduced with a phase difference which increases in the rotational direction of the rotor from one orifice to the next, and the phase of the modulated flows injected through all of the orifices is simultaneously regulated in such a manner that the acoustic waves created by the flows are substantially in opposition, with respect to phase, to those of the noise to be reduced.

The adjustment or modulation of the flow through the orifices is obtained by regulation devices located in each distribution conduit.

Regulation may be effected by shutters, valves or other known means.

These devices may be controlled, for example, by an electronic servo-control box or an electromechanical apparatus of the magneto type driven by gears from the fan or compressor shaft.

To diminish the noise of the rotor-straightener interaction in a fan or compressor, injection may be effected on the outer wall or on the inner wall, or on both at the same time, of the passage downstream of the engine, near to the straight section of the passage containing the downstream edge of the straightener vane to which the orifice is assigned. If the stator vanes are very thick, the orifices may even be located on these vanes.

To reduce the noise of the rotor-inlet vane ring interaction, injection can take place in the straight sections of the machine containing the inlet vane ring; it can also take place in the straight sections situated upstream of this ring, between the inlet vane ring and the movable blades, between the movable blades and the straightener vanes, or downstream of the latter.

By way of non-limiting examples, the invention will be explained in the following by some embodiments thereof which are illustrated by the attached drawings.

BRIEF DESCRIPTION OF THE DRAWINGS

In the drawings,

FIG. 4 shows a variation of the device of FIG. 1;

FIG. 5 shows schematically a device for the cancellation of rotor-straightener interaction noise with the help of rotary valves;

FIG. 6 shows the detail VI of FIG. 5 on a larger scale;

FIG. 7 is a section along the line VII—VII of FIG. 6;

FIG. 8 is a section along VIII—VIII of FIG. 6;

FIG. 11 shows schematically a device for the cancellation of rotor-inlet vane assembly noise with the help of shutter regulators.

DETAILED DESCRIPTION OF THE PREFERRED EMBODIMENTS

Figure 1:
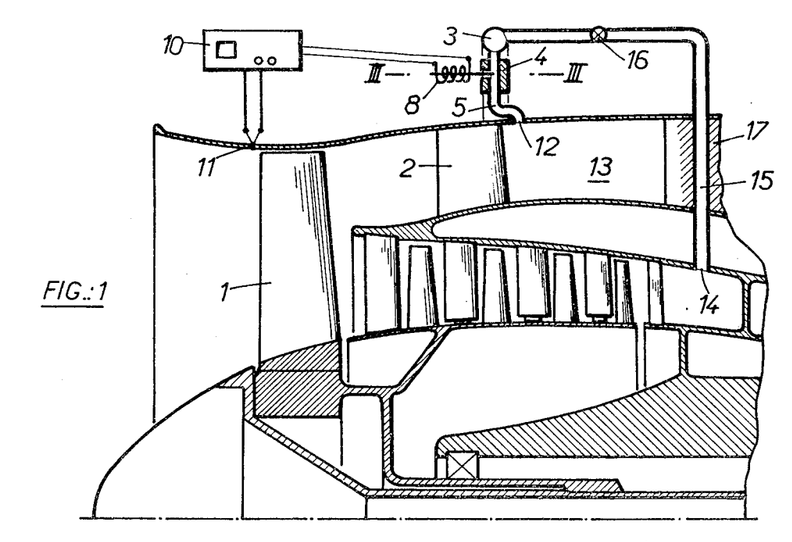
FIG. 1 schematically represents a first embodiment of a device for the cancelling of the rotor-straightener interaction noise with the help of shutter regulators according to the present invention.

The FIG. 1 embodiment of the invention, like all that follow, relates to a bypass gas turbine aero-engine, and shows a system for reducing the noise produced by the interaction of the moving blades 1 of a fan with the straightener vanes 2 located downstream of the fan in the bypass flow duct of the engine.

In the FIG. 1 embodiment, the air injection takes place near to the downstream ends of the straightener vanes 2. The total flow of air to be injected is fed through a toroidal manifold 3. After having passed through flow regulators 4 the air is distributed in the form of partial modulated flows into feed pipes 5. A flow regulator 4 and a feed pipe 5 are located together adjacent the downstream end of each straightener vane 2.

If it is intended to effect the reduction of noise related to the passage frequency of the moving blades (which in the following will be called P.F.M.B.), the modulation of the partial injection flows is also done at P.F.M.B. and the phase difference between the modulated injected flows in the vicinity of two consecutive blades is $2\pi Z_R/Z_s$, where $Z_R$ is the number of rotor blades and $Z_s$ is the number of straightener vanes.

When the noise to be reduced is at the frequency of 2 P.F.M.B., the modulation of the partial injected flows should be made at 2 P.F.M.B. and the formula giving the phase difference is $2 \times 2\pi Z_R/Z_s$.

In every case, the modulated flow has an increasing phase lag as it is moved around the straightener in the rotational direction of the fan. Moreover, in every case the modulation should be sufficiently sinusoidal in order to avoid the introduction of stray noise at multiple frequencies of that to be reduced, and should have a depth of modulation approaching that of 100 so as not to disturb the functioning of the engine by the introduction of a continuous flow component.

Figure 3:
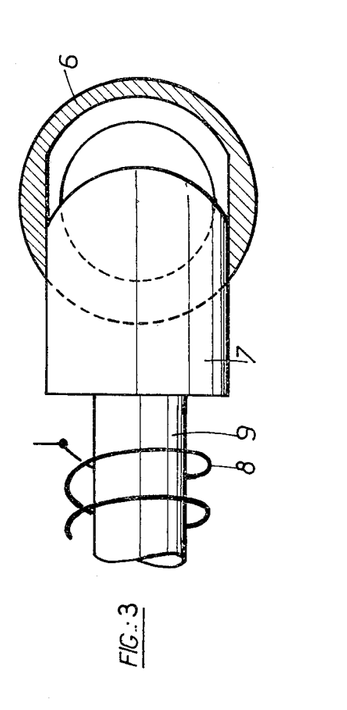
FIG. 3 is a section along the line III—III of FIG. 1.

In the case of this first embodiment of the invention, the flow regulators 4 are shutter regulators, illustrated in FIG. 3 on an enlarged scale and in an orthogonal section with respect to FIG. 1. They each consist of a section of pipe 6, inserted in the feed pipe 5, into which a shutter 7 penetrates to an extent which is adjustable to provide a variable restriction of flow up to and including the complete shutting-off of the flow. Each shutter 7 is actuated by a solenoid 8 into which extends a rod 9 which is connected to the shutter. It is clear that the shutter 7 and rod 9 assembly should have sufficiently low inertia to enable them to be displaced at the required frequencies. The power necessary for moving the shutters is very low and practically only serves to compensate for mechanical frictional losses and electrical losses.

Each solenoid is fed individually by a suitably adjusted electrical current so that the variable flow reduction caused by the shutter results in the modulation of each injected partial flow. The electric current is supplied by an electronic servo-control box 10 which employs a signal emitted by a pick-up 11 sensing the passing of each moving blade 1. The pick-up can be, for example, a photo-electric cell.

For the cancellation of noise of 2 P.F.M.B. frequency, where the modulation should be done at this same frequency, a frequency doubler is connected to the electronic servo-control box 10. The servo-control box again contains a circuit permitting the variation, by the same quantity, of the electrical feed phase of all the solenoids 8 and, through them, the modulation phase of all the partial flows.

Each pipe 5 feeds an injection orifice 12 situated near to the straight section of the engine containing the downstream edge of the straightener vane 2 to which it is assigned. In the first example which has just been described, these injection orifices 12 are arranged in the outer wall forming the duct 13 and are downstream from the fan.

The toroidal manifold 3 should permit a uniform feed to all the flow regulators 4. It should, therefore, be of adequate dimensions and receive air at several points distributed at equal distances around its periphery. This air, intended to feed the manifold 3, is taken from the primary flow of the engine by intakes 14. It is fed to the toroidal manifold 3 through pipes 15 in which are located valves 16 to regulate the flow through the pipes. At any instant the position of all these valves 16 should be the same.

The toroidal manifold 3 and the partial flow circuits, each consisting of a flow regulator 4 and a feed pipe 5, are situated on the outside of the engine so that the supply pipes 15 must pass through the secondary duct; in a preferred solution, they pass through a support strut 17.

Figure 2:
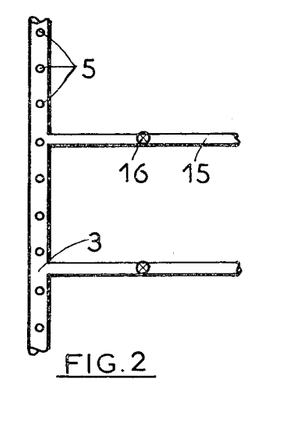
FIG. 2 is a partial view from above of FIG. 1.

The partial flow circuits, each including a flow regulator 4 and a feed pipe 5, are connected to the vanes of the stator ring and are $Z_s$ in number ($Z_s$ being generally fairly large), whilst the pipes 15 bringing air to the toroidal manifold 3 are much fewer in number, as can be seen from FIG. 2. The pipes 15 are, for example, each connected to a different support strut 17. It is only for convenience that a partial flow circuit and an air feed to the manifold are shown on the same axial plane of the turbo-engine in FIG. 1, as well as in FIGS. 4, 5, and 11; this will be referred to later on.

In the embodiment illustrated in FIG. 4, the injection orifices 12 are arranged on the inner wall forming the fan duct 13.

In this variation, the toroidal manifold 3 and the partial flow circuits are situated between the primary duct and the secondary duct, but as in the embodiment in FIG. 1, they are arranged in a stationary part of the engine which here is constituted by the casing between the secondary duct and the primary duct.

Comparative tests of each of these two types of distribution, or direct interaction noise measurement by means of microphones implanted on or near the straightener vanes 2, can provide indications for each of these two embodiments with respect to the better placing of the injection orifices 12. The orifices 12 may be single, as shown on FIGS. 1 to 4, or multiple. Their section may be circular or oval.

In the two embodiments described, the electronic servo-control box 10 is placed on the outside of the engine and, in the second embodiment, the wires controlling the solenoids 8 may cross the secondary duct by using a support strut 17.

The case can also be envisaged where the straightener vanes 2 are very thick. It is then possible to place the injection orifices 12 in the vanes themselves; furthermore, air can be injected simultaneously at the bottom and at the top of the same vane. Thus it becomes possible to distribute the modulated partial flow at the bottom or at the top or at other various heights of each vane by means of a multiple feed line located on the inside of the vane and emerging by a multiplicity of holes into the fan duct.

To obtain a minimum of noise, adjustment is done by adjusting the phase variation circuit acting on the solenoids 8 and by action on the valves 16 regulating the amount of air flow. This adjustment can be envisaged in different ways; simply by manual intervention, by putting it under the control of the engine regulation, or, in a more precise manner, by implanting a microphone flush with the wall of the fan duct, downstream of its stator vanes.

The electronic servo-control box 10 can itself be replaced, especially in the case where the P.F.M.B. of the noise to be diminished is not too high, for example by an electro-mechanical apparatus of the magneto type which does not feature a collector, this apparatus being driven by gears from the fan shaft at a speed of $Z_R$ (= number of rotor vanes) times the speed of the rotor. The phase difference between the feeds of the different solenoids 8 will be obtained by suitable positioning of the outputs of the magneto, each output corresponding to a solenoid. The regulation of the overall phase shift is obtained by a slight rotation of the magneto stator.

Another embodiment, illustrated in FIGS. 5 to 8, only differs from the previous ones by employing, between the toroidal manifold 3 and the feed pipes 5, regulators consisting of valves with a rotating core, and by the control of these elements.

The valve with a rotating core, which acts as a regulator, is shown in detail in FIG. 6 and consists of a cylindrical casing 18 having at its two ends parallel faces 19. A cylindrical valve core 20 rotates within this casing, which core features q identical rectangular slots 21 elongated parallel to the common axis 22 of the casing 18 and of the valve core 20 and distributed at equal distances around the cylindrical wall 23 of the latter. The axial length of the valve core is less than that of the casing 18 so as not to obstruct the outlet of a pipe 24 through which the air arrives from the toroidal manifold 3. Thus, this air can freely enter into the part of the casing 18 which communicates with the inside of the valve core 20 and, after having passed into the valve core, passes through those rectangular slots 21 which find themselves opposite a window 25 machined in the cylindrical wall 23 of the casing, and which gives access to the feed pipe 5.

The window, which can be clearly seen in FIG. 7, has a shape which controls the air flow in such a manner that the fluctuation of the flow which passes through it has an optimum sinusoidal characteristic and the depth of modulation is in the region of 100%. The frequency to which the flow is adjusted should be that of the noise to be reduced so that the valve cores 20 should rotate at a speed equal to $Z_R/q$ times that of the fan, $Z_R$ being the number of rotor blades, as mentioned above. In order to avoid having to employ too rapid rotation of the valve core, it is recommended that there be arranged on the cylindrical wall 23 a large number of rectangular slots 21, the lower limit of the spacing of the slots being set only by the width of the base of the sinusoidal window 25.

The rotation of the valve cores, which only requires very low power, can be effected, as can be seen in FIGS. 5 and 6, by small electric motors 26. The synchronous motors 26 receive an AC current which is supplied, with the suitable phase for each of them, by the electronic box 10, its frequency being determined, with the proportionality factor involved, by the pulses of the pick-up located in proximity to the moving blades 1.

A regulation device is provided to permit the shift, by the same amount, of the phase of all AC currents distributed to the motors 26.

The electronic servo-control box may be replaced by a magneto type device as in the previous examples, or again by a gear transmission coupled to the fan shaft.

The device which has just been described and which is shown in FIG. 5 fulfils the same function as that illustrated in FIG. 1, i.e., it serves to inject air in the vicinity of the outer ends of the vanes. In principle, it will be equally possible to provide injection by means of valve-core flow regulators near to the inner ends of the vanes. However, in view of the large volume of the valves, it will be difficult to locate them between the primary and secondary ducts of the engine and this solution can only be contemplated in very special cases.

Figure 9:
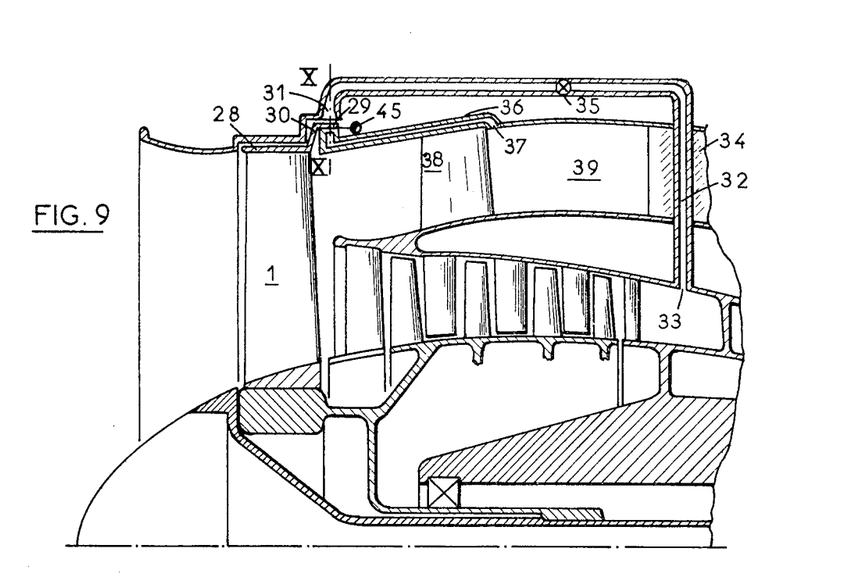
FIG. 9 shows schematically a device for the cancellation of the rotor-straightener interaction noise with the help of a mechanical regulator.

Another embodiment is illustrated in FIG. 9 and relates to a device for the cancellation of rotor-straightener interaction noise in which the regulation of the partial flows injected is effected by a mechanical regulator.

In this case, the air from a toroidal manifold 31 passes through a rotating ferrule 29 which is integral with the outer ends of the moving fan blades, before going by way of feed pipes 36 to injection orifices 37 situated near the outer end of each straightener vane 38. The rotating ferrule, which consists of a cylindrical screen, is provided with a peripheral slot of cyclically varying width, machined in order to create the required periodic variation in flow reduction so that the partial flow passing through the arc of the slot and hence to the mouth of a feed pipe 36 becomes modulated in a sinusoidal manner according to the frequency of the sound to be reduced (P.F.M.B. or 2 P.F.M.B.). The slot, along all its periphery, has the same cyclic variation of width repeated $Z_R$ times (or $2Z_R$ times), $Z_R$ being the number of moving fan blades. The constant phase difference between the modulated partial flows connected to two consecutive feed pipes is automatically brought about. In order to obtain, for the acoustic waves created by the modulated partial flows which are injected, phase opposition to the acoustic waves of the same frequency generated by the engine, a phase regulation system is incorporated which allows the variation by the same amount of the phases of all the modulated partial flows. This system will be described in connection with the following embodiment.

This example illustrates an embodiment of a mechanical flow regulator, at the same time being able to avoid, in certain favorable cases, the machining of a slot of complex cyclical width variation. The rotor-straightener interaction noise being emitted at frequencies of P.F.M.B., 2 P.F.M.B., 3 P.F.M.B., 4 P.F.M.B., it is assumed, on the one hand, that the frequencies of P.F.M.B. is diminished by conventional methods, and on the other hand, that the frequency of 2 P.F.M.B. falls, for example, in the region of 5000 Hz. In these conditions, the frequency of 2 P.F.M.B. is probably the more troublesome, the frequency of 3 P.F.M.B. undergoing a considerable reduction because of atmospheric absorption and the audibility response curve of the ear, and the 4 P.F.M.B. and higher P.F.M.B. multiples being still further reduced by the same processes. The high value of the frequency of 2 P.F.M.B. lends itself poorly to the making of a slot featuring numerous cycles of width variation on the perimeter of the rotating ferrule. The modulation of the flow can therefore be effected by means of 2 $Z_R$ holes of simple shape, for example, triangular or even possibly circular, identical and regularly spaced around the perimeter of the rotating ferrule. Done in this way, the modulation of the flow contains the basic frequency of 2 P.F.M.B. which is sought, as well as 4 P.F.M.B., 6 P.F.M.B., 8 P.F.M.B., etc., which generate stray noise, but these are not very troublesome as they are very strongly reduced by the effects mentioned above; it is to be noted, especially, that the stray frequency of 3 P.F.M.B. which is less reduced than the frequency of 4 P.F.M.B., is not generated.

Figure 10:
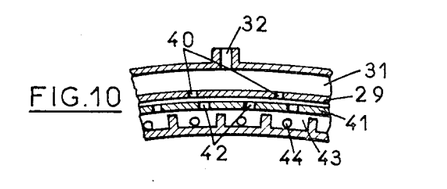
FIG. 10 is a section along the line X—X of FIG. 9.

As can be seen from FIG. 9 and section XX (FIG. 10), the moving blades 1 carry a ferrule 28 on their tips which is integral by way of a bridge-piece 30 with the above-mentioned ferrule 29, which is coaxial with the ferrule 28 and downstream thereof, with a slightly larger diameter perforated by 2 $Z_R$ holes 40 which function as a flow regulator. The total airflow, picked up on the engine and fed to the toroidal manifold 31, passes through the regulator and is distributed in the form of modulated partial flows into injection chambers 43 from which the feed pipes 36 leave at outlets 44, each feed pipe being connected to a part of the duct wall downstream of a straightener vane 38. In order to adjust the phase of the modulated flow introduced into the injection chambers 43, a further ferrule 41 which is perforated by regularly spaced holes 42 of a number equal to the number of straightener vanes $Z_S$, is interposed between the rotating ferrule 29 and the fixed partitions separating the injection chambers 43. In varying the angular positioning of the ferrule 41, for example by means of an hydraulic ram 45, around the casing of the fan, the holes 40 of the ferrule 29 come opposite the holes 42 of the ferrule 41 earlier or later, and the flow from the manifold 31 is hence injected earlier or later into the chambers 43.

From the feed pipes 36, the modulated partial flows are injected into the vicinity of the outer ends of the straightener vanes 38 in the same way as with the previously described devices which made use of shutter regulators or regulators with rotating valve-cores.

When the engine features a compressor for intermediate pressure integral with the fan shaft, a mechanical regulator of the type just described can be used to effect injections near the bottom of the straightener vanes 38. In this case, the ferrule 29 which acts as a flow regulator is driven by the moving ring of one of the intermediate pressure compressor stages, but it features a slot with the same number of cycles of width radiation (or it is perforated by the same number of holes) as before, the frequency of the noise to be reduced always depending on the number of moving blades 1 of the fan.

The following example applies to the case of a bypass gas turbine aero-engine furnished with an inlet vane ring, and to the case where the desired reduction is that of the interaction noise of the fan rotor and the inlet vane ring emitted at the passage frequency of the moving blades (P.F.M.B.) or at its multiples (especially at double the P.F.M.B.).

To reduce the noise of the rotor-inlet vane ring interaction, there is suggested a device analogous to each of the devices (as well as their different variations) described with regard to the reduction of rotor-straightener interaction noise. The application of these devices to the rotor-inlet vane ring interaction noise essentially consists in linking the modulated partial flow circuits to the $Z_{S'}$ vanes of the inlet vane ring (these circuits in the preceding examples were linked to $Z_s$ vanes of the straightener). It is clear that in the formula giving the phase difference between the modulated flows injected linked to two successive blades, $Z_s$ should be replaced by $Z_{s'}$.

FIG. 11 illustrates schematically an embodiment using shutter regulators. In this Figure, which largely corresponds to FIG. 1 in as far as the injection arrangement is concerned, the feed pipe 5 shown in solid lines enters by the orifice 12 situated in the space 46 between the inlet vane ring and the moving rotor blades; it may also enter upstream of the inlet vane ring (i.e. towards the left of the Figure).

The system 5', 12' intended to reduce the noise emission downstream is shown in dotted lines; the orifice 12' could even be located downstream of the straightener vanes (i.e. towards the right of the Figure).

Figure 12:
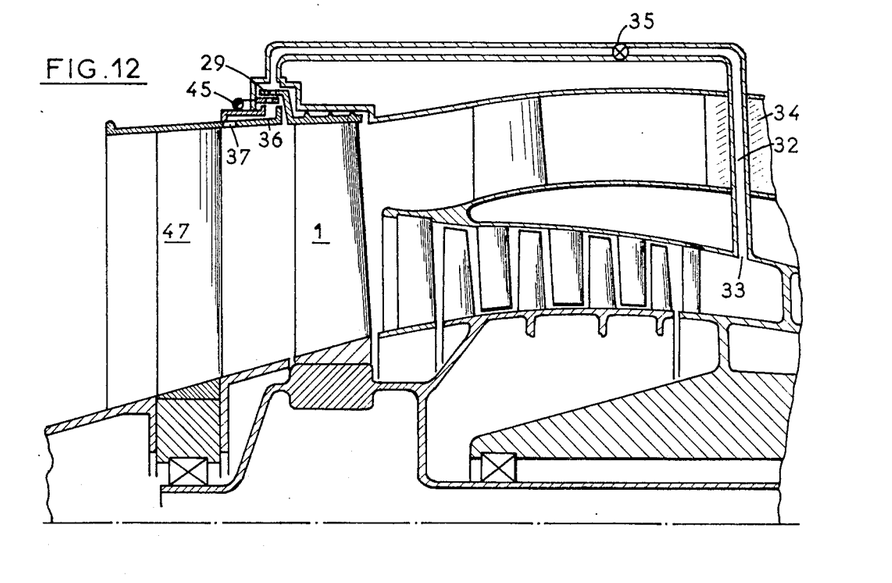
FIG. 12 shows schematically a device for the cancellation of rotor-inlet vane assembly noise with the help of a mechanical regulator.

FIG. 12 shows schematically an embodiment employing a mechanical regulator of the hole type for diminishing rotor-inlet vane ring interaction noise. This is analogous to the embodiment of FIGS. 9 and 10. In the case shown, the feed pipes 36 enter the fan duct by injection orifices 37 downstream of the vanes 47 of the inlet vane ring.

In the event of using a microphone to regulate the flow, this will be implanted in the fan duct, either upstream or downstream, according to whether the noise emission is to be reduced upstream or downstream.

It is clear that an example of employing rotating valve-core regulators could be employed for the diminishing of rotor-inlet vane ring interaction noise. This will be analogous to the example illustrated in FIGS. 5 to 8 for diminishing rotor-straightener interaction noise.

We come finally to a third possiblility for reducing noise: by acting on the noise which is emitted by a rotor alone and which is superimposed (at least, in the more frequent case where there is a stator) on the noise emitted due to the interaction of the rotor and a stator.

In this case, the noise emission is troublesome, particularly at the passage frequency of the moving blades (P.F.M.B.). The noise due to the rotor alone is relatively large, especially in the case of fans without inlet vane rings; further more it is radiated simultaneously in the upstream and downstream sonar fields.

To obtain the noise reduction, the injection of the modulated air takes place at a single point in the duct, upstream or downstream of the rotor, according to whether the noise emission is to be reduced upstream or downstream.

Modulation of flow at P.F.M.B., a modulation which should be as sinusoidal as possible, may be effected by means of a shutter regulator, as in the different embodiments shown in FIGS. 1 to 4, but only a single regulator is fitted; the same is true when a valve-core regulator is used, as in FIGS. 5 to 8. The drawings already referred to are therefore applicable, allowing for the fact that the section shown should be regarded as that which passes through the sole regulator. A mechanical regulator (FIG. 9) can also be employed. It features a single injection circuit and it will be, generally, the type with the slot of cyclically varying width, the type employing holes not being well suited to reduce the P.F.M.B. without running the risk of reinforcing the 2 P.F.M.B.

The information concerning modulation given in the examples (with the exception of that relating to the mechanical regulator of the hole type) throughout the description, normally relates to noise reduction at P.F.M.B., but it should be emphasised that when the noise to be reduced is at a frequency of 2 P.F.M.B., the frequency of the modulation is also 2 P.F.M.B. and a factor 2 is then introduced into the difference of phase of the modulated injected flows at two consecutive blades. This is true in all cases, even if this is not explicitly stated.

The method disclosed for obtaining a reduction of the noise produced by the blades of a ring of rotor blades interacting with the vanes of a ring of stator vanes, and for obtaining a reduction of the noise produced by the blades of a ring of rotor blade acting alone, together with the devices which are described for carrying out this method, can also be applied for reducing the noise produced by the interaction of the blades of a turbine and the vanes of a ring of distributing vanes, or for reducing the noise produced by the blades of a turbine acting alone.

If the distribution vanes of the turbine are provided with an internal network of compressed air channels opening out onto the surface of these vanes to effect their cooling, a part of the network may be modified and provided with a modulation system for putting into effect the method according to the invention.

We claim:

1. An apparatus for reducing the noise produced in a turbo-machine by the interaction of the blades of a ring of rotor blades and the vanes of a ring of stator vanes by creating a counter-noise of opposed phase, said apparatus comprising a plurality of injection orifices located on stationary parts of the machine which are equal in number to the number of vanes of said ring of stator vanes, means for injecting a fluid through said orifices into the flow passage in which said blades and vanes are located, means for modulating the flow through the orifices at the frequency of the noise to be reduced and with a phase difference which increases in an incremental manner from one orifice to the next, and means for simultaneously regulating the phase of the modulated flows injected through the said orifices so that the acoustic waves created by the said flows are substantially in opposition, with respect to phase, to those of the noise to be reduced; said regulating means comprising a cylindrical screen coaxial with the rotor shaft and integral with the tips of the blades of the rotor ring; a circumferential surface encircled by said screen; a plurality of injection pipes leading to said injection orifices and having fixed mouths distributed on said surface; a toroidal manifold surrounding said screen; a peripheral opening in said screen of a width which varies cyclically as it extends around the screen, one face of the said opening being in direct communication with the toroidal manifold and the other face of the said opening moving before the mouth of each of the injection pipes; a phase regulator ring with variable angular setting coaxial with the cylindrical screen and in slidably fitting engagement between the cylindrical screen and the injection pipes; a plurality of identical holes regularly spaced around said phase regulator ring, each communicating with the mouth of an injection pipe; and an injection chamber located at the mouth of each injection pipe to ensure constant communication between the injection pipe and the corresponding hole in the phase regulator ring, regardless of changes in the ring setting.

2. An apparatus according to claim 1, wherein the injection orifices communicate with fluid feed pipes, wherein the feed pipes are connected together by an annular manifold, and wherein each feed pipe includes a flow regulator therein.

3. An apparatus according to claim 2, wherein the peripheral opening formed in the cylindrical screen consists of a slot the width of which varies cyclically as it extends around the screen, the number of cycles being equal to a whole number multiple of the number of rotor blades, and the two edges of the said slot only being brought together to form bridges at the ends of each complete cycle of width variation.

4. An apparatus according to claim 2, wherein the peripheral opening formed in the cylindrical screen consists of holes of simple shape, identical and regularly spaced around the perimeter of the screen, the said holes being in number equal to twice the number of rotor blades.

5. In a turbo-machine which includes an elongated, hollow, stationary outer wall, a rotatable rotor ring mounted centrally inside of said outer wall and comprising an elongated rotor shaft and a number of radial rotor blades extending from said rotor shaft towards said stationary outer wall, and a stationary stator ring having a number of radial stator vanes extending towards said stationary outer wall, the improvement wherein said turbo-machine includes an apparatus for reducing the noise generated by the interaction of the rotating rotor blades and the stationary stator vanes by creating a counter-noise of opposed phase, this apparatus comprising:

a cylindrical screen integrally connected to the tips of said rotor blades at the ends thereof opposite the ends connected to said rotor shaft, said cylindrical screen being mounted so as to extend coaxially with said rotor shaft, a circumferential surface encircled by said cylindrical screen, said circumferential surface forming a part of said stationary outer wall, the annular space formed between the cylindrical screen and the circumferential surface including an annular injection chamber, a plurality of injection orifices located in said stationary outer wall and distributed around the circumference thereof, the number of injection orifices being equal to the number of vanes in said stator ring, a plurality of injection pipes, each injection pipe interconnecting a respective injection orifice with a corresponding point along the circumference of said annular injection chamber, means forming a toroidal manifold surrounding said cylindrical screen, means for supplying a constant flow of fluid to said toroidal manifold, a peripheral opening in said cylindrical screen of a width which varies cyclically as it extends around said cylindrical screen, the outer mouth of said opening facing said toroidal manifold and the inner mouth facing said annular injection chamber so as to move, as said cylindrical screen rotates, near the mouths of said injection pipes and control the frequency of fluid passed to said injection orifices from said toroidal manifold, and a phase regulator ring positioned to be coaxial with the cylindrical screen and to be axially slidably positioned in said annular space between said cylindrical screen and said mouths of said injection pipes, said phase regulator having a plurality of identical, regularly spaced radial holes for controlling communication of fluid passing from the toroidal manifold through the peripheral opening in the rotating cylindrical screen to the mouths of the injection pipes, said phase regulator being angularly adjustable so as to modulate the phase of the fluid passed to said injection orifices.

* * * * *

UNITED STATES PATENT OFFICE
CERTIFICATE OF CORRECTION

PATENT NO. : 4,255,083
DATED : March 10, 1981

INVENTOR(S) : Pierre Alexandre Andre et al

It is certified that error appears in the above-identified patent and that said Letters Patent are hereby corrected as shown below:

ON THE TITLE PAGE:

[22] Filed November 7, 1977

[30] Foreign Application Priority Data

November 5, 1976 [FR] France..............76 34065

Signed and Sealed this

Twenty-fourth Day of November 1981

[SEAL]

Attest:

GERALD J. MOSSINGHOFF

*Attesting Officer*   *Commissioner of Patents and Trademarks*